Aug. 15, 1950   T. W. SMITH, JR   2,519,324
TWO-PIECE RUBBER WHISTLE FOR TOYS
Filed Sept. 25, 1947

INVENTOR.
THOMAS W. SMITH, JR.
BY
*Ely D. Frye*
ATTORNEYS

Patented Aug. 15, 1950

2,519,324

UNITED STATES PATENT OFFICE 2,519,324

TWO-PIECE RUBBER WHISTLE FOR TOYS

Thomas W. Smith, Jr., Akron, Ohio, assignor to The Sun Rubber Company, Barberton, Ohio, a corporation of Ohio Application September 25, 1947, Serial No. 776,031

2 Claims. (Cl. 46—179)

The present invention relates to whistles made of rubber or rubber like composition intended for use in the manufacture of hollow rubber dolls, or toys for the amusement of infants or small children. It has been customary to manufacture toys of this type with metal whistles which are embedded within the wall of the article, but metal whistles or other noisemakers have been objectionable because of the danger of the embedded noisemaker becoming dislodged.

To obviate this danger it has been proposed to make the whistle of rubber so that even if it is dislodged from the body of the toy the child can not be injured by sharp metal. However, rubber whistles such as made in the past do not produce a desirable tone. The note given off by the rubber whistles heretofore used has a deadened tone and not the shrill quality or the high pitch which is produced by the ordinary metal whistle.

The rubber whistle has many advantages from a safety standpoint, but its use was restricted because of these unsatisfactory sound properties. It is the purpose of the present invention to change the design of a rubber whistle so as to correct and improve upon its sound giving properties with the result that it gives out a loud shrill noise equal in every respect to the noise created by aspirating the ordinary metal whistle.

In the drawing, there are shown two types or embodiments of the invention, either one of which will produce the loud, shrill tone which is desirable in noisemaking toys.

In the drawing in which the preferred forms of improved whistles are shown:

Figure 1:
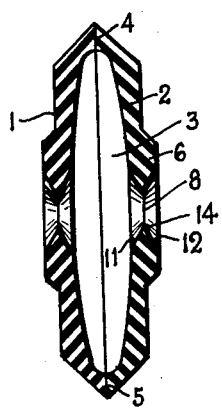
Fig. 1 is a cross section through a rubber whistle of one type.
Figure 2:
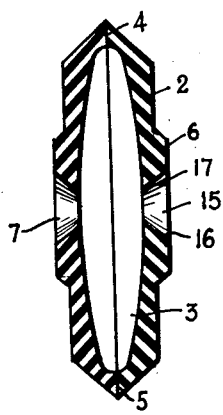
Fig. 2 is a similar view of a rubber whistle of the second type.
Figure 3:
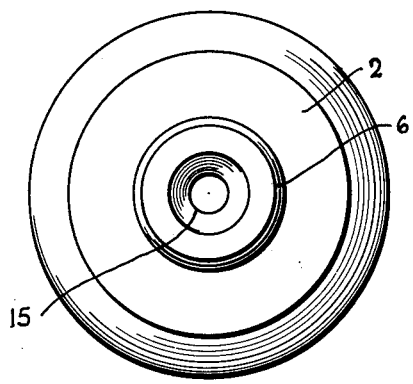
Fig. 3 is a plan view of the whistle shown in Fig. 2.

Referring to either Figure 1 or 2, the whistle is made of two like sections or halves 1 and 2 of vulcanized rubber placed in opposite relation. Each section of the whistle is hollowed out on its inner face so that when the sections are joined, a hollow chamber 3 is provided in the interior of the whistle. Each section is molded with a flat rim 4 about its periphery and these surfaces are cemented as indicated at 5 so that when the surfaces are pressed into contact the sections adhere. Each section of the whistle is formed with a raised central portion 6 through which the orifice 8 (Fig. 1) extends to the inner chamber, the orifices being opposed. As shown in Fig. 1, each orifice 8 is formed with two converging conical surfaces 11 and 12, which meet centrally of the orifice in a sharp, thin, or feather edge 14. In Fig. 2 the orifice 15 is formed by a single conical surface 16 which terminates in a sharp, thin, or feather edge 17, coincident with one of the surfaces of the side wall.

It will be seen that in both cases the circumference of the orifice is formed by a sharp thin line of rubber. In this respect the whistles of the present invention differ radically from rubber whistles formerly used, which were formed with orifices having cylindrical walls and consequently thick lips or rims were formed about the passage to the inner chamber.

There is very little difference between the sound produced by aspirating either type of whistle shown herein. Each produces a loud shrill tone such as is characteristic of the metal whistle and this seems to be due to the provision of the thin or feather edge about the circumference of the orifice.

To make the whistle sections, a two part mold is provided of the proper contour and to form either orifice, a pin or pins of the shape of the orifice are set in the mold halves. The mold should be carefully loaded so that the rubber fills out the space about the pin properly to secure the thin feather edge. It is possible to mold the whistle section with a straight orifice and subsequently to ream out the orifice so as to create an orifice of the proper contour, but this requires a further manipulation which increases the cost of manufacture.

It is not necessary that the surfaces forming the wall of the orifice be counter-sunk on exact cones, for they may be formed on a radius if desired, so long as the extreme inner edge is sharp and thin to give the desired tone quality.

Other modifications may be adopted and other forms of counter-sinking may be employed which will not alter the essential features of the present invention, it being intended that the invention shall not be limited to the identical forms thereof shown in the drawings and described herein.

What is claimed is:

1. A whistle composed of two rubber disks, each of said disks being hollowed out on one surface and having outer peripheral rim portions, the disks being placed with the rims in contact and the hollowed out portions in opposition forming a central chamber of substantially oval cross section, and an aperture in each disk leading to the chamber, the wall of at least one of said disks being reduced in cross section as it approaches the aperture therein to form a relatively thin edge portion surrounding the aperture therein.

2. A whistle composed of two rubber disks, said disks having outer peripheral rim portions placed in contact with one another, the area of each disk within the rim being concave and placed in opposition to the similar concave area of the other disk to form a central chamber of substantially oval cross section, oppositely positioned apertures in the central portion of the disks, the wall thickness of at least one of said disks being reduced as it approaches the aperture therein to form a relatively thin flexible edge portion surrounding the aperture.

THOMAS W. SMITH, JR.

REFERENCES CITED

The following references are of record in the file of this patent:

UNITED STATES PATENTS

| Number | Name | Date |
| --- | --- | --- |
| 134,308 | Pfeiffer | Dec. 24, 1872 |
| 1,378,022 | Girard | May 17, 1921 |
| 1,616,664 | Maywald | Feb. 8, 1927 |
| 1,954,688 | Hees | Apr. 10, 1934 |
| 2,485,749 | Ladd | Oct. 25, 1949 |